United States Patent
Hilbert et al.

(10) Patent No.: US 12,273,153 B2
(45) Date of Patent: Apr. 8, 2025

(54) SYSTEM AND METHOD FOR SURFACING CHANNEL QUALITY INDICATOR (CQI) DATA ASSOCIATED WITH A MULTI-MODE ANTENNA

(71) Applicant: KYOCERA AVX COMPONENTS (SAN DIEGO), INC., San Diego, CA (US)

(72) Inventors: Jeffrey L. Hilbert, Dana Point, CA (US); Sebastian Rowson, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

(21) Appl. No.: 17/197,286

(22) Filed: Mar. 10, 2021

(65) Prior Publication Data

US 2021/0288729 A1    Sep. 16, 2021
US 2022/0407614 A9    Dec. 22, 2022

Related U.S. Application Data

(60) Provisional application No. 63/004,625, filed on Apr. 3, 2020, provisional application No. 62/988,584, filed on Mar. 12, 2020.

(51) Int. Cl.
*H04B 17/336* (2015.01)
*H04B 17/327* (2015.01)
(Continued)

(52) U.S. Cl.
CPC ......... *H04B 17/336* (2015.01); *H04B 17/327* (2015.01); *H04B 17/345* (2015.01); *H04B 17/382* (2015.01)

(58) Field of Classification Search
CPC ............... H04B 17/336; H04B 17/327; H04B 17/345; H04B 17/382; H04B 17/318;
(Continued)

(56) References Cited

U.S. PATENT DOCUMENTS

| | | |
|---|---|---|
| 6,765,536 B2 | 7/2004 | Phillips et al. |
| 6,987,493 B2 | 1/2006 | Chen |

(Continued)

OTHER PUBLICATIONS

International Search Report and Written Opinion for Application No. PCT/US2021/021652, mailed on Jun. 18, 2021, 13 pages.

(Continued)

*Primary Examiner* — Un C Cho
*Assistant Examiner* — Rasha K Fayed
(74) *Attorney, Agent, or Firm* — Dority & Manning, P.A.

(57) ABSTRACT

A method for surfacing data indicative of a channel quality indicator (CQI) associated with a multi-mode antenna of a first device is provided. The method includes obtaining data indicative of the CQI while the multi-mode antenna is configured in each of a plurality of antenna modes. Each of the plurality of antenna modes has a distinct radiation pattern. The method includes determining one of the plurality of antenna modes as a selected antenna mode for the multi-mode antenna based, at least in part, on the data indicative of the CQI. The method includes providing the data indicative of the CQI associated with one or more antenna modes of the plurality of antenna modes to a second device that is separate from the first device.

11 Claims, 5 Drawing Sheets

(51) Int. Cl.
*H04B 17/345* (2015.01)
*H04B 17/382* (2015.01)

(58) Field of Classification Search
CPC .... H04B 17/102; H04B 17/309; H04B 17/24; H04B 1/44; H04B 7/0602; H04B 7/0404; H04B 7/0871; H04B 7/10; H04B 7/0848; H04B 7/0802; H04B 7/0691; H04B 7/0689; H04B 7/0617; H04B 7/063; H04B 7/061; H04B 7/04; H04B 7/0695; H04B 7/0408; H04B 7/0413; H04L 25/0212; H04L 5/0048; H04L 5/001; H04L 5/0023; H04L 45/74; H04W 72/1263; H04W 72/082; H04W 72/12; H04W 72/085; H04W 52/283; H04W 52/42; H04W 52/243; H04W 16/28
See application file for complete search history.

(56) References Cited

U.S. PATENT DOCUMENTS

| | | | |
|---|---|---|---|
| 7,068,234 | B2 | 6/2006 | Sievenpiper |
| 7,215,289 | B2 | 5/2007 | Harano |
| 7,830,320 | B2 | 11/2010 | Shamblin |
| 7,911,402 | B2 | 3/2011 | Rowson et al. |
| 8,362,962 | B2 | 1/2013 | Rowson et al. |
| 8,446,318 | B2 | 5/2013 | Ali et al. |
| 8,648,755 | B2 | 2/2014 | Rowson et al. |
| 8,717,241 | B2 | 5/2014 | Shamblin et al. |
| 8,854,477 | B2 * | 10/2014 | Asjadi ................. H04N 17/045 348/192 |
| 9,065,496 | B2 | 6/2015 | Rowson et al. |
| 9,231,669 | B2 | 1/2016 | Desclos et al. |
| 9,240,634 | B2 | 1/2016 | Rowson et al. |
| 9,425,497 | B2 | 8/2016 | Pajona et al. |
| 9,439,151 | B2 | 9/2016 | Zhu et al. |
| 9,462,488 | B2 | 10/2016 | Pajona et al. |
| 9,479,242 | B2 | 10/2016 | Desclos et al. |
| 9,590,703 | B2 | 3/2017 | Desclos et al. |
| 9,755,305 | B2 | 9/2017 | Desclos et al. |
| 9,755,580 | B2 | 9/2017 | Desclos et al. |
| 10,439,272 | B1 | 10/2019 | Rowson et al. |
| 10,840,602 | B2 | 11/2020 | Henry et al. |
| 2008/0214198 | A1* | 9/2008 | Chen ................. H04L 1/003 455/452.2 |
| 2010/0316033 | A1* | 12/2010 | Atwal ................. H04W 74/002 370/338 |
| 2012/0044804 | A1* | 2/2012 | Rahman ................. H04L 45/22 370/225 |
| 2013/0100928 | A1* | 4/2013 | Matsumori ............. H01Q 7/00 370/331 |
| 2014/0162566 | A1* | 6/2014 | Desclos ............... H04B 7/0404 455/575.7 |
| 2015/0280773 | A1* | 10/2015 | Chang ................. H04B 1/44 455/78 |
| 2015/0311969 | A1* | 10/2015 | Desclos ............... H04W 40/12 455/63.4 |
| 2016/0080058 | A1 | 3/2016 | Kang et al. |
| 2016/0306025 | A1* | 10/2016 | Nicolas ............... G01S 5/02521 |
| 2017/0048141 | A1 | 2/2017 | Kish et al. |
| 2017/0070436 | A1* | 3/2017 | Lubenski ............... H04W 36/22 |
| 2017/0133759 | A1* | 5/2017 | Singh ................... H01Q 19/10 |
| 2017/0245211 | A1* | 8/2017 | Patil ..................... H04W 8/005 |
| 2018/0007703 | A1* | 1/2018 | Pajona ............. H04W 72/1226 |
| 2018/0316617 | A1* | 11/2018 | Lubenski ............... H04L 47/193 |
| 2018/0352553 | A1* | 12/2018 | Shtrom ................ H04L 5/001 |
| 2018/0359710 | A1 | 12/2018 | Desclos et al. |
| 2019/0007080 | A1* | 1/2019 | Manian ................. H04B 1/48 |
| 2019/0149365 | A1* | 5/2019 | Chatterjee ............. H04L 5/0044 370/329 |
| 2019/0207672 | A1 | 7/2019 | Arora et al. |
| 2019/0281588 | A1* | 9/2019 | Zhang ................. H04L 5/0051 |
| 2019/0289514 | A1* | 9/2019 | Ronen ................... H01Q 3/08 |
| 2019/0386726 | A1* | 12/2019 | Fresia ................. H04B 7/0695 |
| 2020/0052727 | A1 | 2/2020 | Roe et al. |
| 2020/0260295 | A1* | 8/2020 | Escudero ............. H04B 17/309 |
| 2020/0343908 | A1* | 10/2020 | Song ............... H03M 13/6597 |
| 2020/0389876 | A1* | 12/2020 | Islam ................. H04W 72/042 |
| 2020/0389908 | A1* | 12/2020 | Shabbo ................ H04B 7/0456 |
| 2020/0403672 | A1* | 12/2020 | Pajona ................ H04B 7/0689 |
| 2021/0204287 | A1* | 7/2021 | Tsai ..................... H04W 72/02 |
| 2022/0039051 | A1* | 2/2022 | Ergen ................... G01S 5/0205 |

OTHER PUBLICATIONS

Extended European Search Report for Application No. 21768615.3, mailed Nov. 24, 2023, 9 pages.

* cited by examiner

SYSTEM AND METHOD FOR SURFACING CHANNEL QUALITY INDICATOR (CQI) DATA ASSOCIATED WITH A MULTI-MODE ANTENNA

PRIORITY CLAIM

The present application claims the benefit of priority of U.S. Provisional App. No. 62/988,584, titled "System and Method for Surfacing Channel Quality Indicator (CQI) Data Associated with a Multi-Mode Antenna," having a filing date of Mar. 12, 2020, which is incorporated by reference herein. The present application also claims the benefit of priority of U.S. Provisional App. No. 63/004,625, titled "System and Method for Surfacing Channel Quality Indicator (CQI) Data Associated with a Multi-Mode Antenna," having a filing date of Apr. 3, 2020, which is incorporated by reference herein.

FIELD

The present disclosure relates generally to devices having a multi-mode antenna and, more particularly, a method for surfacing CQI data from the multi-mode antenna to one or more remote devices configured to process the data to analyze performance of a network.

BACKGROUND

Multi-mode antennas can be used in various applications. For example, multi-mode antennas can be used in a smartphone to facilitate communication with other devices, such as other smartphones. Multi-mode antennas can be configurable in a plurality of antenna modes. Each of the plurality of antenna modes can have a distinct radiation pattern. Furthermore, one or more control devices can be configured to obtain data indicative of the CQI while a multi-mode antenna is configured in each of the plurality of antenna modes. The one or more control devices can be configured to determine one of the plurality of antenna modes as a selected antenna mode for the multi-mode antenna based, at least in part, on the data indicative of the CQI. In this manner, the multi-mode antenna can be configured in an antenna mode (e.g., the selected antenna mode) that provides an optimal or near optimal communication link between the multi-mode antenna and one or more remote devices (e.g., router, cell tower, etc.).

SUMMARY

Aspects and advantages of embodiments of the present disclosure will be set forth in part in the following description, or may be learned from the description, or may be learned through practice of the embodiments.

In one aspect, a method for surfacing data indicative of a channel quality indicator (CQI) associated with a multi-mode antenna of a first device is provided. The method includes obtaining data indicative of the CQI while the multi-mode antenna is configured in each of a plurality of antenna modes. Each of the plurality of antenna modes has a distinct radiation pattern. The method includes determining one of the plurality of antenna modes as a selected antenna mode for the multi-mode antenna based, at least in part, on the data indicative of the CQI. The method includes providing the data indicative of the CQI associated with one or more antenna modes of the plurality of antenna modes to a second device that is separate from the first device.

In another aspect, a system for surfacing CQI data associated with a multi-mode antenna is provided. The system includes a multi-mode antenna associated with a first device. The multi-mode antenna is configurable to operate in a plurality of antenna modes. Each antenna mode of the plurality of antenna modes has a distinct radiation pattern. The system further includes one or more control devices. The one or more control devices are configured to obtain data indicative of a CQI while the multi-mode antenna is configured in each of the plurality of antenna modes. The one or more control devices are further configured to determine one of the plurality of antenna modes as a selected antenna mode for the multi-mode antenna based, at least in part, on the data indicative of the CQI. The one or more control devices are even further configured to provide the data indicative of the CQI to a second device that is separate from the first device.

In yet another aspect, a method for controlling operation of a network is provided. The method includes providing, by one or more computing devices of a first device, a request for data indicative of a channel quality indicator (CQI) associated with one or more antenna modes of a plurality of antenna modes in which a multi-mode antenna of a second device that is remote relative to the first device is configurable. The method includes obtaining, by the one or more computing devices, the data indicative of the CQI associated with the one or more antenna modes from the second device. The method includes performing, by the one or more computing devices, one or more network analytics operations based, at least in part, on the data indicative of the CQI. The method includes performing, by the one or more computing devices, one or more control actions based, at least in part, on the one or more network analytics operations.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
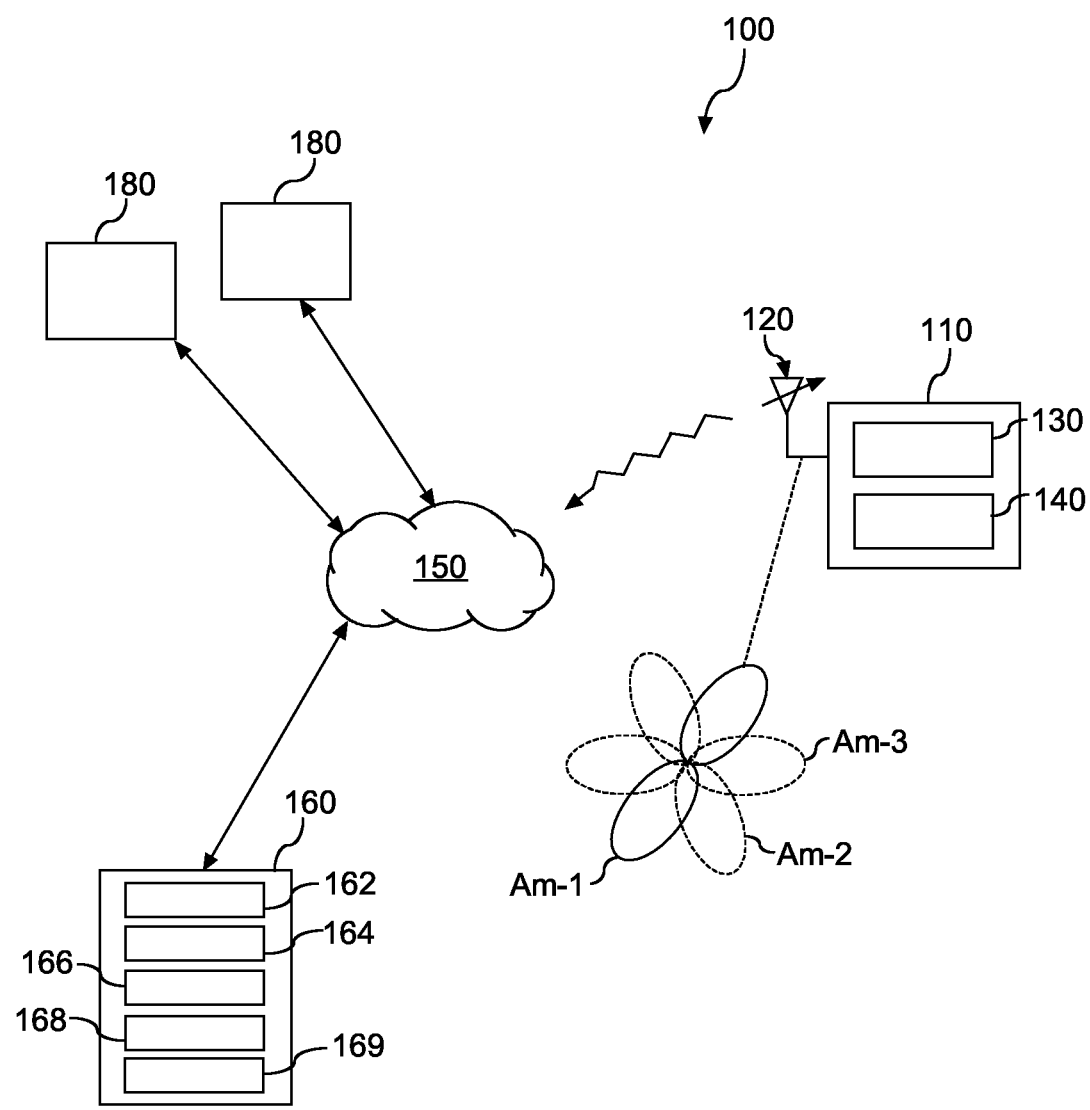
FIG. 1 depicts a system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a system for surfacing channel quality indicator (CQI) for one or more antenna modes of a plurality of antenna modes in which a multi-mode antenna of a first device is configurable. In some implementations, the first device can be a mobile computing device (e.g., smartphone, tablet, laptop, etc.). The system can include one or more control devices. The one or more control devices can be configured to obtain the data indicative of the CQI while the multi-mode antenna is configured in each of the plurality of antenna modes. The one or more control devices can be further configured to select one of the plurality of antenna modes as a selected antenna mode and configure the multi-mode antenna in the selected antenna mode. As will be discussed below, the one or more control devices can be configured to provide the data indicative of the CQI to a second device (e.g., network controller) that is separate from the first device and is configured to determine performance of a network based, at least in part, on the data indicative of the CQI.

In some implementations, the one or more control devices can be configured to provide the data indicative of the CQI to the second device each time the one or more control devices implement a control routine associated with obtaining or updating the data indicative of the CQI for each of the plurality of antenna modes in which the multi-mode antenna is configurable. For instance, the one or more control devices can be configured to implement the control routine at predetermined intervals of time. Alternatively, the one or more control devices can be configured to implement the control routine in response to a trigger event. For instance, the one or more control devices can be configured to implement the control routine each time power for device associated with multi-mode antenna is cycled.

In some implementations, the system can include an application programming interface configured to facilitate communication between the first device and the second device. For instance, one or more computing devices of the second device can be configured to execute a software application (e.g., computer-readable instructions) associated with monitoring performance of a network. In such implementations, a request from the software application for the data indicative of the CQI can be provided to the one or more control devices of the first device via the application programming interface. Furthermore, the data indicative of the CQI can be provided to the software application via the application programming interface. In this manner, the application programming interface can provide bidirectional communications between the first device and the second device. As will be discussed below in more detail, the second device can be configured to perform one or more network analytics operations based, at least in part, on the data indicative of the CQI.

In some implementations, the software application executed on one or more computing devices of the second device can include one or more machine-learned models. In such implementations, the one or more network analytics operations can include providing the data indicative of the CQI as an input to the one or more machine-learned models. The one or more machine-learned models can be configured to process the data indicative of the CQI and output data indicative of performance of the network. It should be appreciated that, in some implementations, one or more additional data feeds separate from the data indicative of the CQI can be provided as an input to the one or more machine-learned models.

In some implementations, the second device can include a display (e.g., screen). In this manner, the data the one or more machine-learned models output can be displayed for viewing. Alternatively or additionally, the data indicative of the CQI can be displayed for viewing at the second device. In some implementations, the data the one or more machine-learned models output can be provided to the first device via the application programming interface. As will be discussed below, the second device can be configured to perform one or more control actions based, at least in part, on the one or more network analytics operations.

In some implementations, the one or more control actions can include providing one or more control signals associating with adjusting an antenna mode for a multi-mode antenna of one or more client devices on the network. For instance, the one or more control signals can be associated with switching the multi-mode antenna of the one or more client devices from a first antenna mode to a second antenna mode that is different than the first antenna mode to improve performance of the network.

The system according to example aspects of the present disclosure can provide numerous technical benefits and advantages. For instance, surfacing (e.g., providing) the data indicative of the CQI to a second device (e.g., network controller) that is separate from the first device having the multi-mode antenna can allow one or more computing devices of the second device to process the data and determine one or more adjustments to one or more client devices on the network to improve performance of communications on the network. In this manner, performance of communications on the network can be improved due, at least in part, to the data indicative of the CQI for the multi-mode antenna that is surfaced (e.g., provided) to the second device.

Referring now to the FIGS, FIG. 1 depicts a system 100 according to example embodiments of the present disclosure. As shown, the system 100 can include a first device 110 having a multi-mode antenna 120. In some implementations, the first device 110 can be a mobile computing device, such as a smartphone, laptop, tablet, wearable device, etc. The multi-mode antenna 120 can be configured to provide beam steering functionality to improve link quality between the first device 110 and a second device 160 that is remote (e.g., separate from) relative to the first device 110 and in communication with the first device 110. More particularly, the multi-mode antenna 120 can be configurable in a plurality of antenna modes (e.g., Am-1, Am, 2, Am, 3, etc.). Each antenna mode of the plurality of antenna modes can be associated with a different radiation pattern and/or polarization. It should be understood that the first device 110 can include any suitable number of multi-mode antennas 120. For instance, in some implementations, the first device 110 can include two or more multi-mode antennas 120.

In some implementations, the multi-mode antenna 120 can communicate with the second device 160 via a network 150. It should be appreciated that the multi-mode antenna 120 can be configured to communicate with the second device 160 via any suitable type of network 150. For example, in some implementations, the network 150 can be a cellular network. In alternative implementations, the network 150 can be an 802.11 network (e.g., WiFi network) or other wireless local area network (WLAN).

As shown, the system 100 can include one or more control devices 130. The one or more control devices 130 can, in some implementations, be positioned onboard the first device 110. The one or more control devices 130 can be configured to control operation of the multi-mode antenna 120. For instance, the one or more control devices 130 can configure the multi-mode antenna 120 in each of the plurality of antenna modes. In this manner, the one or more control devices 130 can obtain the data indicative of the CQI for each of the plurality of antenna modes. Furthermore, the one or more control devices 130 can be configured to determine one of the plurality of antenna modes as a selected antenna mode for the multi-mode antenna 120 based, at least in part, on the data indicative of the CQI. The one or more control devices 130 can be further configured to surface (e.g., provide) the data indicative of the CQI for one or more of the antenna modes of the multi-mode antenna 120 to the second device 160 which, as will be discussed below in more detail, can be configured to analyze performance of the network 150 based, at least in part, on the data indicative of the CQI.

In some implementations, the second device 160 can include one or more computing devices 162. The one or more computing devices 162 can include one or more processors and one or more memory devices. The processor(s) can include any suitable processing device, such as a microprocessor, microcontroller, integrated circuit, logic device, or other suitable processing device. The memory device(s) can include one or more computer-readable media, including, but not limited to, non-transitory computer-readable media, RAM, ROM, hard drives, flash drives, or other memory devices.

The memory device(s) can store information accessible by the processor(s), including computer-readable instructions that can be executed by the processor(s). The computer-readable instructions can be any set of instructions that, when executed by the processor(s), cause the processor(s) to perform operations. The computer-readable instructions can be software written in any suitable programming language or may be implemented in hardware. In some embodiments, the computer-readable instructions can be executed by the processor(s) to cause the processor(s) to perform operations, which will now be discussed in more detail.

The one or more computing devices 162 can be configured to perform one or more network analytics operations based, at least in part, on the data indicative of the CQI. In some implementations, the second device 160 can include one or more machine-learned models 164. In such implementations, the one or more network analytics operations can include providing the data indicative of the CQI as an input to the one or more machine-learned models 164. The one or more machine-learned models 164 can be configured to process the data indicative of the CQI to output data that is indicative of performance of the network 150. In some implementations, the second device 160 can include a display screen 166. In this manner, the data the one or more machine-learned models 164 output can be provided for viewing via the display screen 166. Alternatively, or additionally, the data indicative of the CQI can be provided for viewing by the display screen 166 of the second device 160.

It should be appreciated that the one or more machine-learned models 164 can include any suitable type of machine-learned model. For instance, the one or more machine-learned models 164 can include, without limitation, a random forest classifier; a logistic regression classifier; a support vector machine; one or more decision trees; a neural network; and or other types of machine-learned models, including both linear models and non-linear models. Example neural networks can include feed-forward neural networks, recurrent neural networks (e.g., long short-term memory recurrent neural networks), or other forms of neural networks.

In some implementations, the one or more machine-learned models 164 can be trained through use of a model trainer 168. The model trainer 168 can train the one or more machine-learned models 164 using one or more training or learning algorithms. One example training technique is backwards propagation of errors ("backpropagation"). For example, backpropagation can include Levenberg-Marquardt backpropagation. In some implementations, the model trainer 168 can perform supervised training techniques using a set of labeled training data. In other implementations, the model trainer 168 can perform unsupervised training techniques using a set of unlabeled training data. The model trainer 168 can perform a number of generalization techniques to improve the generalization capability of the models being trained. Generalization techniques include weight decays, dropouts, or other techniques. In particular, the model trainer 168 can train the one or more machine-learned models 164 based on a set of training data 169. The training data 169 can includes a number of training examples. Each training example can include an instance of data indicative of CQI for one or more of the antenna modes of the plurality of antenna modes in which the multi-mode antenna 120 can be configured.

In some implementations, the one or more computing devices 162 can be configured to perform one or more control actions based, at least in part, on the one or more network analytics operations. For example, the one or more computing devices 162 can determine one or more adjustments to one or more of a plurality of client devices 180 on the network 150 based, at least in part, on the data the one or more machine-learned models 164 output that is indicative of performance of the network 150. In some implementations, the one or more control actions can include providing one or more control signals associated with adjusting an antenna mode for a multi-mode antenna (not shown) of the one or more client devices 180. For instance, the one or more control signals can be associated with switching the multi-mode antenna (not shown) of the one or more client devices from a first antenna mode to a second antenna mode that is different than the first antenna mode to improve performance of the network 150.

In some implementations, the one or more computing devices 162 can be configured to implement a software application. For example, the third party software application can be associated with monitoring performance of the network 150. In such implementations, the system 100 can include an application programming interface 140 to facilitate communication between one or more control devices 130 and the software application. For instance, the application programming interface 140 can allow the one or more control devices 130 to obtain a request from the software application for the data indicative of the CQI for one or more antenna modes of the multi-mode antenna 120 of the first device 110. Furthermore, the one or more control devices 130 can provide the data indicative of the CQI associated with the one or more antenna modes of the multi-mode antenna 120 to the software application via the application programming interface 140. It should be appreciated that the application programming interface 140 can be bidirectional. In this manner, data indicative of performance of the network 150 as determined by the software application can be provided to the one or more control devices 130 via the application programming interface 140.

It should be appreciated that examples of data indicative of the channel quality indicator associated with one or more of the antenna modes of the multi-mode antenna 120 can include a receive signal strength indicator (RSSI), a signal-to-noise ratio (SNR), a signal-to-interference-plus-noise ratio (SINR), a magnitude error ratio (MER), an error vector magnitude (EVM), a bit error rate (BER), a block error rate (BLER), a packet error rate (PER), or combinations of the foregoing, and/or various other metrics.

Figure 2:
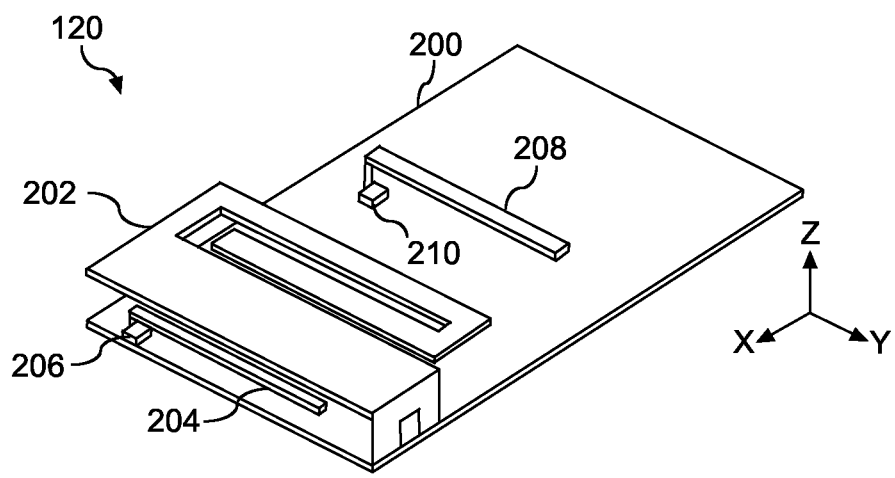
FIG. 2 depicts a multi-mode antenna according to example embodiments of the present disclosure.

FIG. 2 illustrates an example multi-mode antenna 120 according to the present disclosure. As shown, the multi-mode antenna 120 can include a circuit board 200 (e.g., including a ground plane) and a driven antenna element 202 disposed on the circuit board 200. An antenna volume may be defined between the circuit board 200 (e.g., and the ground plane) and the driven antenna element 202. The multi-mode antenna 120 can include a first parasitic element 204 positioned at least partially within the antenna volume. The multi-mode antenna 120 can further include a first tuning element 206 coupled with the first parasitic element 204. The first tuning element 206 can be a passive or active component or series of components and can be configured to alter a reactance on the first parasitic element 204 either by way of a variable reactance or shorting to ground. It should be appreciated that altering the reactance of the first parasitic element 204 can result in a frequency shift of the multi-mode antenna 120. It should also be appreciated that the first tuning element 206 can include at least one of a tunable capacitor, MEMS device, tunable inductor, switch, a tunable phase shifter, a field-effect transistor, or a diode.

In some implementations, the multi-mode antenna 120 can include a second parasitic element 208 disposed adjacent the driven antenna element 202 and outside of the antenna volume. The multi-mode antenna 120 can further include a second tuning element 210. In some implementations, the second tuning element 210 can be a passive or active component or series of components and may be configured to alter a reactance on the second parasitic element 208 by way of a variable reactance or shorting to ground. It should be appreciated that altering the reactance of the second parasitic element 208 result in a frequency shift of the multi-mode antenna 120. It should also be appreciated that the second tuning element 210 can include at least one of a tunable capacitor, MEMS device, tunable inductor, switch, a tunable phase shifter, a field-effect transistor, or a diode.

In example embodiments, operation of at least one of the first tuning element 206 and the second tuning element 210 can be controlled to adjust (e.g., shift) the antenna radiation pattern of the driven antenna element 202. For example, a reactance of at least one of the first tuning element 206 and the second tuning element 210 can be controlled to adjust the antenna radiation pattern of the driven antenna element 202. Adjusting the antenna radiation pattern can be referred to as "beam steering". However, in instances where the antenna radiation pattern includes a null, a similar operation, commonly referred to as "null steering", can be performed to shift the null to an alternative position about the driven antenna element 202 (e.g., to reduce interference).

Figure 3:
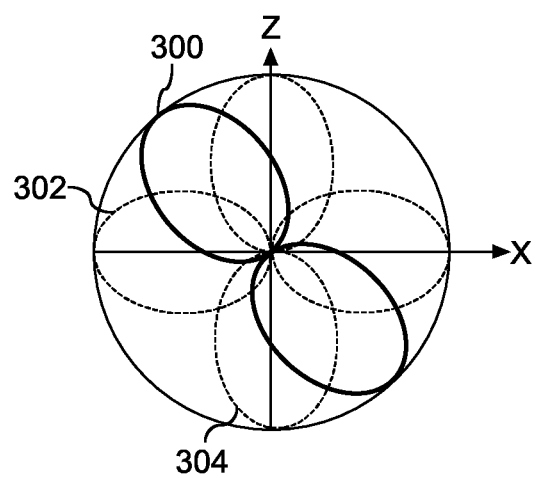
FIG. 3 depicts a two-dimensional radiation pattern associated with a multi-mode antenna according to example embodiments of the present disclosure.

FIG. 3 depicts antenna radiation patterns associated with the multi-mode antenna 120 of FIG. 1 according to example embodiments of the present disclosure. It should be appreciated that operation of at least one of the first parasitic element 204 and the second parasitic element 208 can be controlled to configure the multi-mode antenna 120 in a plurality of modes. It should also be appreciated that the multi-mode antenna 120 can have a distinct antenna radiation pattern or antenna polarization when configured in each of the plurality of modes.

In some implementations, the multi-mode antenna 120 can have a first antenna radiation pattern 300 when the multi-mode antenna 120 is configured in a first mode of the plurality of modes. In addition, the multi-mode antenna 120 can have a second antenna radiation pattern 302 when the multi-mode antenna 120 is configured in a second mode of the plurality of modes. Furthermore, the multi-mode antenna 120 can have a third antenna radiation pattern 304 when the multi-mode antenna 120 is configured in a third mode of the plurality of modes. As shown, the first antenna radiation pattern 300, the second antenna radiation pattern 302, and the third antenna radiation pattern 304 can be distinct from one another. In this manner, the multi-mode antenna 120 can have a distinct radiation pattern when configured in each of the first mode, second mode, and third mode.

Figure 4:
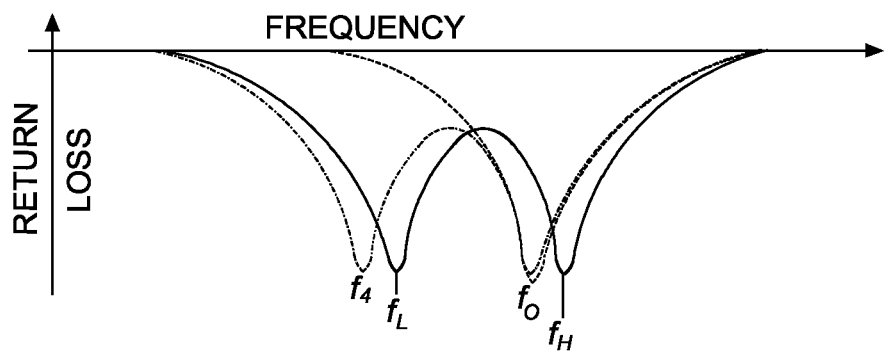
FIG. 4 depicts a frequency plot of a multi-mode antenna according to example embodiments of the present disclosure.

FIG. 4 depicts an example frequency plot of the multi-mode antenna 120 of FIG. 1 according to some aspects of the present disclosure. It should be understood that an electrical characteristic (e.g., reactance) of at least one of the first parasitic element 204 and the second parasitic element 208 can be controlled. In this manner, the electrical characteristic of at least one of the first parasitic element 204 and the second parasitic element 208 can be adjusted to shift a frequency at which the corresponding multi-mode antenna is operating.

In some implementations, the multi-mode antenna 120 can be tuned to a first frequency $f_0$ when the first parasitic element 204 and the second parasitic element 208 are deactivated (e.g., switched off). Alternatively and/or additionally, the multi-mode antenna 120 can be tuned to frequencies $f_L$ and $f_H$ when the second parasitic element 208 is shorted to ground. Furthermore, the multi-mode antenna 120 can be tuned to frequency $f_4$ when both the first parasitic element 204 and the second parasitic element 208 are shorted to ground. Still further, the multi-mode antenna 120 can be tuned to frequencies $f_4$ and $f_0$ when the first parasitic element 204 and the second parasitic element 208 are each shorted to ground. It should be understood that other configurations are within the scope of this disclosure. For example, more or fewer parasitic elements may be employed. The positioning of the parasitic elements may be altered to achieve additional modes that may exhibit different frequencies and/or combinations of frequencies.

FIGS. 2-4 depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern.

Figure 5:
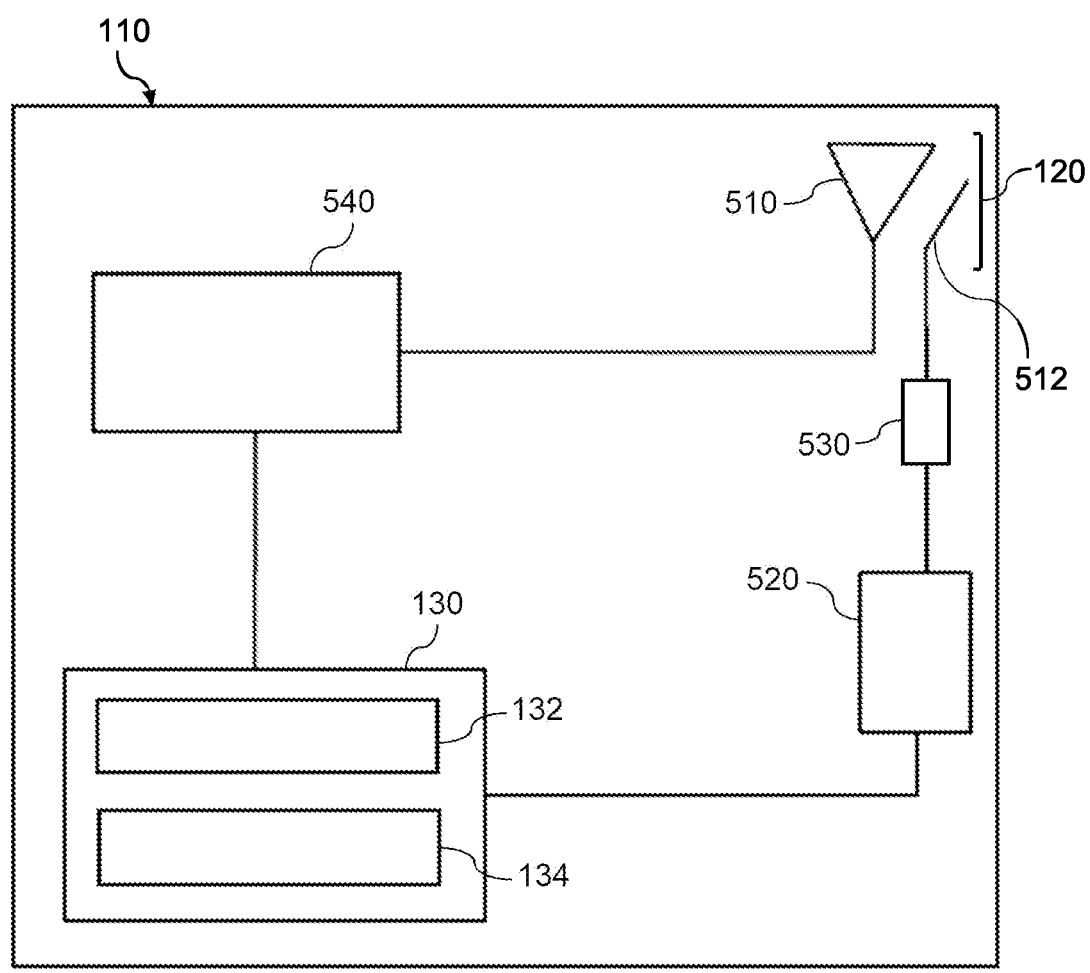
FIG. 5 depicts a block diagram of components of a device of the system of FIG. 1 according to example embodiments of the present disclosure.

Referring now to FIG. 5, an example embodiment of the first device 110 of the system 100 discussed above with reference to FIG. 1 is provided. As shown, the multi-mode antenna 120 can include a driven element 510 and a parasitic element 512. The multi-mode antenna 120 can, as discussed above, be operable in a plurality of different antenna modes. Each mode of the plurality of antenna modes can be associated with a different radiation pattern and/or polarization characteristics, for instance, as described above with reference to FIGS. 2-4. Furthermore, although the first device 110 is depicted as having only one multi-mode antenna 120, it should be appreciated that the first device 110 can include any suitable number of multi-mode antennas 120. For instance, in some implementations, the first device 110 can include two or more multi-mode antennas 120.

The first device 110 can include a tuning circuit 520 configured to control an electrical characteristic associated with the parasitic element 512 to operate the multi-mode antenna 120 in the plurality of different antenna modes. In some implementations, the first device 110 can include a tunable component 530. As shown, the tunable component 530 can be coupled between the parasitic element 512 and the tuning circuit 520. The tuning circuit 520 can be configured to control operation of the tunable component 530 to alter the electrical connectivity of the parasitic element 512 with a voltage or current source or sink, such as coupling the parasitic element 512 to an electrical ground.

The first device 110 can include RF circuitry 540. In some implementations, the RF circuitry 540 can include a front end module. The front end module can include, for instance, one or more power amplifiers, low noise amplifiers, impedance matching circuits, etc. In this manner, the front end module can be configured to amplify the RF signal that is transmitted to and/or received from the driven element 510 of the multi-mode antenna 120.

In some implementations, the one or more control devices 130 of the first device 110 can be operatively coupled to the tuning circuit 520. In this manner, the one or more control devices 130 can be configured to control operation of the tuning circuit 520 to configure the multi-mode antenna 120 in the plurality of different antenna modes. Alternatively, or additionally, the one or more control devices 130 can be in electrical communication with the RF circuitry 540. In this manner, RF signals received at the multi-mode antenna 120 can be provided to the one or more control devices 130 via the RF circuitry 540. In addition, the one or more control devices 130 can provide data to be modulated onto a transmit RF signal provided to the driven element 510 of the multi-mode antenna 120 via the RF circuitry 540.

The one or more control devices 130 can include one or more processors 132 and one or more memory devices 134. The processor(s) 132 can include any suitable processing device, such as a microprocessor, microcontroller, integrated circuit, logic device, or other suitable processing device. The memory device(s) 134 can include one or more computer-readable media, including, but not limited to, non-transitory computer-readable media, RAM, ROM, hard drives, flash drives, or other memory devices.

The memory device(s) 134 can store information accessible by the processor(s) 132, including computer-readable instructions that can be executed by the processor(s) 132. The computer-readable instructions can be any set of instructions that, when executed by the processor(s) 132, cause the processor(s) 132 to perform operations. The computer-readable instructions can be software written in any suitable programming language or may be implemented in hardware. In some embodiments, the computer-readable instructions can be executed by the processor(s) 132 to cause the processor(s) 132 to perform operations, which will now be discussed in more detail.

Figure 6:
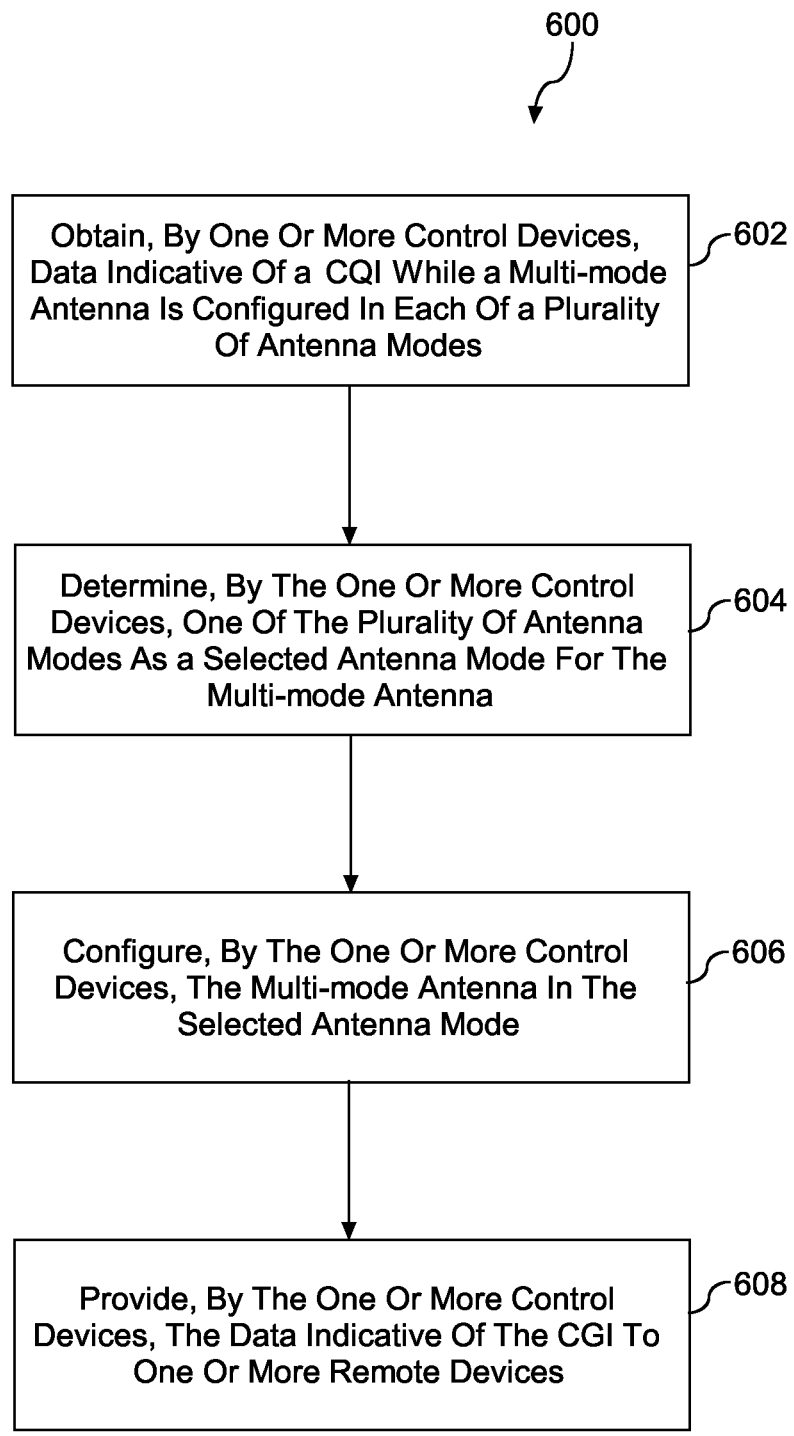
FIG. 6 depicts a flow diagram of a method for surfacing data indicative of a channel quality indicator associated with one or more antenna modes of a multi-mode antenna according to example embodiments of the present disclosure.

Referring now to FIG. 6, a flow diagram of a method 600 for surfacing data indicative of a CQI associated with a multi-mode antenna of a first device is provided according to example embodiments of the present disclosure. In general, the method 600 will be discussed herein with reference to the system 100 described above with reference to FIG. 1. In addition, although FIG. 6 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (602), the method 600 can include obtaining, by one or more control devices, data indicative of the CQI while the multi-mode antenna is configured in each of a plurality of antenna modes, each of the plurality of antenna modes having a distinct radiation pattern. For instance, in some implementations, the multi-mode antenna can be configurable in four different antenna modes. In such implementations, the one or more control devices can be configured to obtain data indicative of the CQI of the multi-mode antenna when configured in each of the four different antenna modes. It should be understood, however, that the multi-mode antenna can be configurable in any suitable number of antenna modes.

At (604), the method 600 can include determining, by the one or more control devices, one of the plurality of antenna modes as a selected antenna mode for the multi-mode antenna based, at least in part, on the data indicative of the CQI obtained at (602). Furthermore, at (606), the method 600 can include configuring, by the one or more control devices, the multi-mode antenna in the selected antenna mode.

At (608), the method 600 can include providing, by the one or more control devices, data indicative of the CQI associated with one or more antenna modes of the plurality of antenna modes to a second device that is separate from the first device. In some implementations, the method 600 can include providing the data indicative of the CQI associated with one or more antenna modes of the plurality of antenna modes in response to obtaining a request from a software application implemented by the one or more computing devices of the first device. For instance, in such implementations, the one or more control devices can obtain the request via an application programming interface configured to facilitate communication between the first device and the second device. More specifically, the application programming interface facilitates communication (e.g., bidirectional) between the first device and a software application executed by one or more computing devices of the second device.

Figure 7:
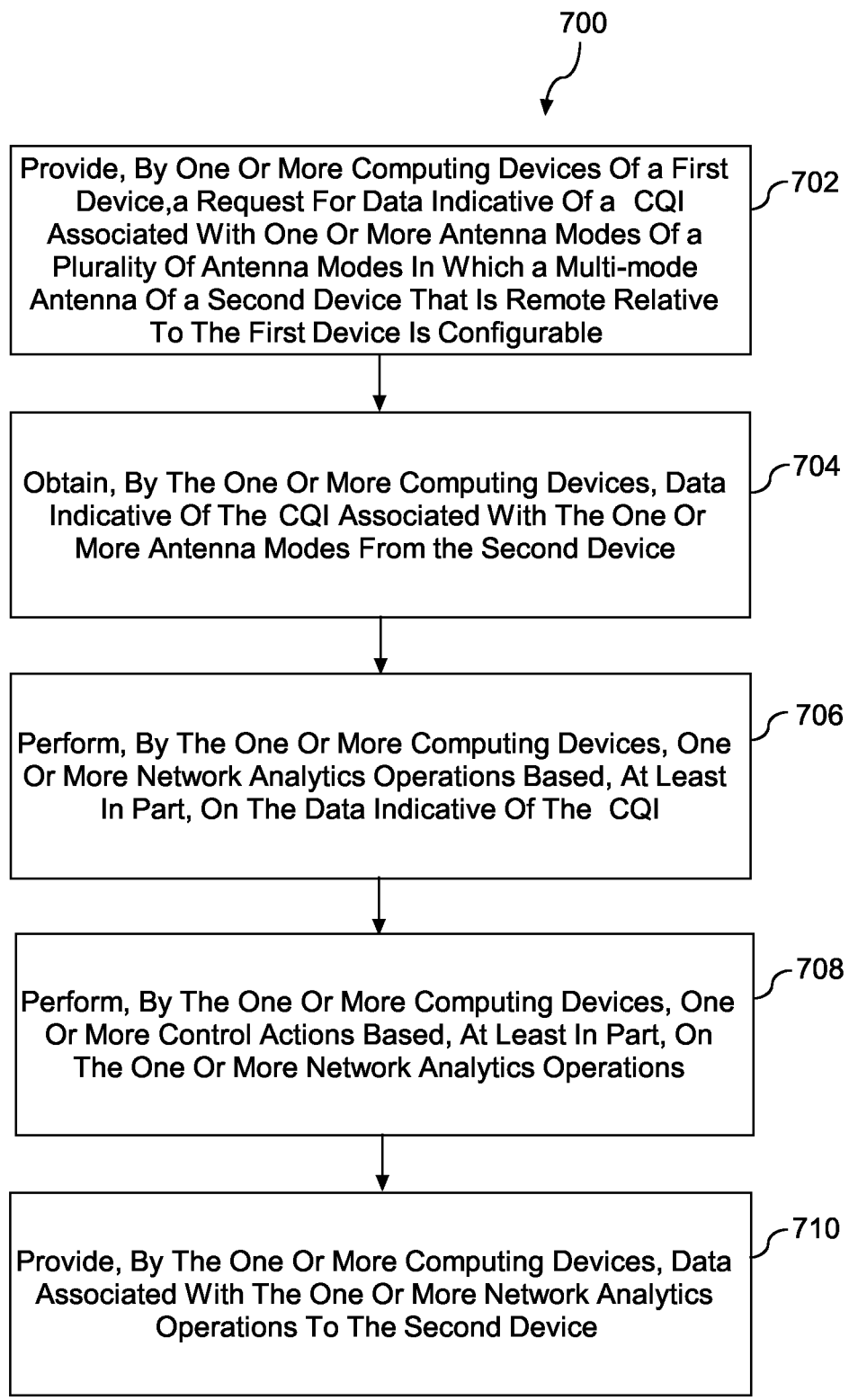
FIG. 7 depicts a flow diagram of a method for controlling operation of a communication network according to example embodiments of the present disclosure.

Referring now to FIG. 7, a flow diagram of a method 700 for controlling operation of a communication network is provided according to example embodiments of the present disclosure. In general, the method 700 will be discussed herein with reference to the system 100 described above with reference to FIG. 1. In addition, although FIG. 7 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (702), the method 700 includes providing, by one or more computing devices of a first device, a request for data indicative of a CQI associated with one or more antenna modes of a plurality of antenna modes in which a multi-mode antenna of a second device that is remote relative to the first device.

At (704), the method 700 includes, obtaining, by the one or more computing devices, the data indicative of the CQI from the second device having the multi-mode antenna. It should be appreciated that the data indicative of the channel quality indicator associated with one or more of the antenna modes of the multi-mode antenna 120 can include a receive signal strength indicator (RSSI), a signal-to-noise ratio (SNR), a signal-to-interference-plus-noise ratio (SINR), a magnitude error ratio (MER), an error vector magnitude (EVM), a bit error rate (BER), a block error rate (BLER), a packet error rate (PER), or combinations of the foregoing, and/or various other metrics. In some implementations, obtaining the data indicative of the CQI can include displaying, by the one or more computing devices, the data indicative of the CQI via a display associated with the first device.

At (706), the method 700 includes performing, by the one or more computing devices, one or more network analytics operations based, at least in part, on the data indicative of the CQI associated with one or more antenna modes of the plurality of antenna modes in which the multi-mode antenna is configurable. For instance, in some implementations, performing the one or more network analytics operations can include providing, by the one or more computing devices, the data indicative of the CQI obtained at (704) as an input to one or more machine-learned models. The one or more machine-learned models can, as discussed above, process the data indicative of the CQI to output data indicative of the performance of the network.

At (708), the method 700 includes performing, by the one or more computing devices, one or more control actions based, at least in part, one or more network analytics operations performed at (706). For instance, in some implementations, performing one or more control actions can include providing, by the one or more computing devices, one or more control signals associated with adjusting operation of one or more client devices on the network based, at least in part, on data associated with the one or more network analytics operations performed at (706). In particular, in some implementations, the one or more client devices can include a multi-mode antenna, and the one or more control signals can be associated with configuring the multi-mode antenna of the one or more client devices in one of the plurality of antenna modes based, at least in part, on the results of the one or more network analytics operations performed at (706).

At (710), the method 700 includes providing, by the one or more computing devices, data associated with the one or more network analytics operations performed at (706) to the second device having the multi-mode antenna. For instance, in some implementations, the data can be provided via an application programming interface configured to facilitate communication between the first device and the second device. It should be appreciated that the data provided to the first device can include any data indicative of performance of the network.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for surfacing data indicative of a channel quality indicator (CQI) associated with a multi-mode antenna of a first device on a network, the method comprising:

obtaining, by one or more control devices of the first device, data indicative of the CQI while the multi-mode antenna is configured in each of a plurality of antenna modes, each of the plurality of antenna modes having a distinct radiation pattern;

determining, by the one or more control devices of the first device, one of the plurality of antenna modes as a selected antenna mode for the multi-mode antenna based, at least in part, on the data indicative of the CQI;

obtaining, by the one or more control devices of the first device, a request for the data indicative of the CQI from a software application implemented on a second device;

responsive to obtaining the request for the data indicative of the CQI from the second device, providing, by the one or more control devices of the first device, the data indicative of the CQI associated with one or more antenna modes of the plurality of antenna modes to the second device that is separate from the first device, the second device configured to provide the data indicative of the CQI as an input to one or more machine-learned models configured to process the data indicative of the CQI and output data indicative of performance of the network; and receiving, by the one or more control devices of the first device, one or more control signals from the second device, the one or more control signals associated with adjusting an antenna mode of one or more client devices on the network based, at least in part, on the output data indicative of performance of the network;

wherein the one or more control devices obtain the request via an application programming interface configured to facilitate communication between the one or more control devices of the first device and the software application implemented on the second device.

2. The method of claim 1 wherein providing the data indicative of the CQI associated with one or more of the antenna modes comprises providing, by the one or more control devices, the data indicative of the CQI associated with each of the plurality of antenna modes.

3. The method of claim 1, wherein the data indicative of the CQI comprises at least one of a receive signal strength indicator (RSSI), signal-to-noise ratio (SNR) or signal-to-interference-plus-noise ratio (SINR).

4. The method of claim 1, wherein providing the data indicative of the CQI associated with one or more antenna modes of the plurality of antenna modes to the second device comprises providing, by the one or more control devices, the data indicative of the CQI associated with the selected antenna mode for the multi-mode antenna.

5. The method of claim 1, wherein providing the data indicative of the CQI to the second device comprises providing, by the one or more control devices, the data indicative of the CQI over a network to the second device.

6. The method of claim 5, wherein the network comprises a cellular network or a wireless local area network.

7. The method of claim 1, further comprising:
configuring, by the one or more control devices, the multi-mode antenna in the selected antenna mode.

8. A system comprising:
a multi-mode antenna associated with a first device on a network, the multi-mode antenna configurable to operate in a plurality of antenna modes, each antenna mode of the plurality of antenna modes having a distinct radiation pattern;
one or more control devices associated with the first device, the one or more control devices configured to:
 obtain data indicative of a channel quality indicator (CQI) while the multi-mode antenna is configured in each of the plurality of antenna modes;
 determine one of the plurality of antenna modes as a selected antenna mode for the multi-mode antenna based, at least in part, on the data indicative of the CQI;
 obtain a request for the data indicative of the CQI from a software application implemented on a second device that is separate from the first device;
 provide the data indicative of the CQI to the second device, the second device configured to provide the data indicative of the CQI as an input to one or more machine-learned models configured to process the data indicative of the CQI and output data indicative of performance of the network; and
 receive one or more control signals from the second device, the one or more control signals associated with adjusting an antenna mode of one or more client devices on the network based, at least in part, on the output data indicative of performance of the network; and
an application programming interface stored on one or more memory devices, the application programming interface configured to facilitate communication between the one or more control devices associated with the first device and the software application implemented on the second device,
wherein the one or more control devices associated with the first device are configured to provide the data indicative of the CQI to the second device in response to obtaining the request from the software application implemented on the second device.

9. The system of claim 8, wherein the one or more control devices are further configured to:
configure the multi-mode antenna in the selected antenna mode.

10. The system of claim 8, wherein the first device comprises a mobile computing device.

11. A method for controlling operation of a network, the method comprising:
providing, by one or more computing devices of a first device, a request for data indicative of a channel quality indicator (CQI) associated with one or more antenna modes of a plurality of antenna modes in which a multi-mode antenna of a second device that is remote relative to the first device is configurable;
responsive to providing the request for the data indicative of the CQI to the second device, obtaining, by the one or more computing devices of the first device, the data indicative of the CQI associated with the one or more antenna modes from the second device;
performing, by the one or more computing devices of the first device, one or more network analytics operations based, at least in part, on the data indicative of the CQI, wherein the one or more network analytics operations comprise providing the data indicative of the CQI as an input to one or more machine-learned models configured to process the data indicative of the CQI and output data indicative of performance of the network;
performing, by the one or more computing devices of the first device, one or more control actions based, at least in part, on the one or more network analytics operations, wherein the one or more control actions comprise providing one or more control signals associated with adjusting an antenna mode of one or more client devices on the network based, at least in part, on the output data indicative of performance of the network; and
providing, by the one or more computing devices of the first device, data associated with the one or more network analytics operations to the second device via an application programming interface.

* * * * *